Patented May 12, 1925.

1,537,572

UNITED STATES PATENT OFFICE

FRANZ ZERNIK, OF BERLIN-WILMERSDORF, GERMANY.

BASE FOR ARTIFICIAL RESINS, WAXLIKE SUBSTANCES, AND LACQUERS.

No Drawing. Application filed January 21, 1922. Serial No. 530,932.

*To all whom it may concern:*

Be it known that I, FRANZ ZERNIK, a citizen of the German Republic, residing at Berlin-Wilmersdorf, Germany, have invented certain new and useful Improvements in Bases for Artificial Resins, Waxlike Substances, and Lacquers, of which the following is a specification.

This invention relates to a product of manufacture adapted for forming the base for light-colored artificial resins, wax-like substances and colorless lacquers, for the manufacture of such products naphthenic acid salts practically insoluble in water being employed. It has been ascertained that light-colored substances may be obtained by starting with naphthenic acid which has been previously purified by distillation or in any other suitable manner and, when drying is required, by not exceeding the drying temperature of 160° C. Care should be taken to avoid any higher temperatures in the drying operation, as otherwise the substance would undergo undesirable decomposition and very considerable darkening and discoloration in the drying operation; while on the other hand, by properly regulating the drying operation, light-colored products are obtained adapted for forming the base for light-colored artificial resins, wax-like substances and colorless lacquers. If the naphthenic acid employed is previously freed from unsaponifiable matter, the artificial resins obtained are substantially colorless.

I have found that, whereas the single naphthenates are less adapted for the base for artificial resins, etc., mixtures of different naphthenates are extremely valuable for such purposes. Such mixtures may be made in different manners as by mechanically mixing, by melting, or by simultaneous precipitation (mixed precipitation). By combining, for instance, 1 part of zinc-naphthenate, which is completely insoluble in water, with 3 parts of magnesium naphthenate, which is soluble in cold water only up to 0.6%, an artificial resin may be obtained, only 0.008% of which are soluble in cold water, while it is very easily soluble in the ordinary solvents, such as amylacetate, benzol, solvent-naphtha and the like, and the appearance of which is like colophony. In a similar manner by the simultaneous precipitation of suitable quantities of the easily friable calcium-naphthenate with the elastic aluminum-naphthenate and with the tough zinc-naphthenate, an artificial resin is obtained which, when dissolved in suitable solvents, such as amylacetate, yields a very light liquid. Upon drying there is produced a solid, elastic and non-brittle coating of lacquer. Many other examples of this kind may be cited.

It has also been ascertained that the artificial resins manufactured in the manner described on being fused with certain other nonresinous substances, which are solid and substantially nonvolatile at ordinary temperatures, yield a clear solution and after cooling products are obtained which resemble waxes both as regards appearance and properties. Such admixtures for effecting the fusion may, for instance, be any of the following:—ceresine, paraffine, japan-wax, carnauba-wax, lanoline or wool grease and similar substances. The properties of the artificial resins obtained are governed by the kind and proportions of the elementary substances employed in their manufacture. Thus, for instance, a fused mixture of 15 parts of zinc-naphthenate, 70 parts of magnesium-naphthenate with 15 parts of carnauba-wax shows a fusion-point of 98° C. In accordance with the composition the products exhibit a granular or conchoidal fracture and are more or less adapted to kneading.

Magnesium-naphthenate is of especial importance. It is readily soluble in the usual solvents, such as amylacetate, benzine, benzol, wood oil, solvent-naphtha, oil of turpentine and tetraline. Even 50% solutions remain thinly liquid. Its ready solubility is a most advantageous distinguishing feature over the far more difficultly soluble naphthenates of calcium, barium and strontium. Thus, for example, calcium-naphthenate is scarcely soluble in benzol, and only up to 10% in benzine, and in tetraline up to about 15% and in solvent-naphtha up to about 30%. Aluminum-naphthenate is only soluble up to 7.5% in benzol, up to 10% in benzine; and in tetraline it is likewise only soluble up to about 10%, and in solvent-naphtha up to 25%. These latter solutions are very viscous. As compared with aluminum-naphthenate, which has an elastic and gelatinous consistence and accordingly yields an elastic soft coating of lacquer upon evaporation of its decidedly viscous solutions, magnesium-naphthenate moreover is distinguished by its solid, colophony-like nature and by the corresponding hardness of the lacquer remaining upon evaporation of its solution. Through zinc-naphthenate is as readily soluble as magnesium-naphthenate, its solution yields a tough coating of lacquer which is very sticky, even at a comparatively low temperature.

It is one of the great advantages connected with the use of the magnesium-naphthenate that its property of serving as a base for artificial resins etc. may be regulated as regards elasticity, toughness and hardness by but slight additions of the other naphthenates mentioned. Preferably a mixture of magnesium-naphthenate with a small amount of zinc-naphthenate is employed. Furthermore it is advantageous for many purposes to combine the naphthenate of magnesium with the elastic aluminum-naphthenate and the rather brittle naphthenates of calcium, barium and strontium or with the rather tough naphthenate of zinc in any suitable manner, so as to be able to regulate the elasticity and hardness of the resulting products in accordance with the purpose to be accomplished. Also the naphthenate of magnesium in combination with other suitable ingredients, with colophony for instance, may be employed for various industrial purposes.

*Examples.*

1. Mechanical mixture; a mixture of 55 part of calcium-naphthenate, 37.5 parts of aluminum-naphthenate and 7.5 parts of zinc-naphthenate, all the naphthenates produced by means of double decomposition from a solution of naphthenic-acid-soap obtained from a naphthenic acid purified by distillation and freed from unsaponifiable matter, yields a light-colored solution with 2 parts of amyl-acetate, such solution leaving a transparent and colorless coating of lacquer upon evaporation.

2. Mixture by fusion: 20 parts of zinc-naphthenate and 60 parts of magnesium-naphthenate, both obtained by double decomposition as before, are fused together at low temperature and yield a suitable artificial resin. If these 80 parts of this artificial resin are fused with 16 parts of ceresine and 4 parts of carnauba-wax, an artificial wax of light-brown colour and conchoidal fracture is obtained.

3. Mixed precipitation: A solution of sodium-naphthenate obtained as before is precipitated with a mixture of the calculated amount of the chlorides of magnesium, zinc and aluminum in such a manner that 1000 parts of the original naphthenic acid correspond to 110 parts of chloride of magnesium, 20 parts of chloride of zinc and 70 parts of chloride of aluminum. The mixed precipitate after washing out is dried at 120° C. until the weight is constant. It is a transparent, yellowish, brittle mass characteristic of artificial resin. A 33⅓% solution thereof in amyl-acetate leaves on evaporation a colorless and transparent, elastic coating of lacquer. On melting 20 parts of this artificial resin with 80 parts of ceresine, a yellowish artificial resin which can be kneaded is obtained.

"Naphthenic acids" (German "naphtensäuren"), as used herein, are the organic acids which are produced from certain crude oils by extraction with alkaline hydroxid, either immediately from the earth oil or after its usual treatment with concentrated sulphuric acid. Naphthenic acids occur in the oil which issues from the earth at or about Baku and other places; cf. Richter's Organic Chemistry (Smith), 1907, Vol. II, page 300.

I claim:

1. A product of manufacture suitable as a base for artificial resins, waxlike substances and lacquers comprising a mixture of light-colored naphthenates practically insoluble in water.

2. A product of manufacture suitable as a base for artificial resins, waxlike substances and lacquers comprising a mixture of light-colored naphthenates practically insoluble in water, one of said naphthenates being magnesium-naphthenate.

3. A product of manufacture suitable as a base for artificial resins, waxlike substances and lacquers comprising a mixture of light-colored magnesium-naphthenate and zinc-naphthenate.

4. A product of manufacture suitable as a base for artificial resins, waxlike substances and lacquers comprising a mixture of light-colored magnesium-naphthenate, zinc-naphthenate and aluminum-naphthenate.

In testimony whereof, I affix my signature.

Dr. FRANZ ZERNIK.